United States Patent
Sanderovich

(10) Patent No.: US 9,312,985 B2
(45) Date of Patent: Apr. 12, 2016

(54) TECHNIQUES FOR RATE SELECTION IN MILLIMETER-WAVE COMMUNICATION SYSTEMS

(71) Applicant: WILOCITY LTD., Caesarea (IL)

(72) Inventor: Amichai Sanderovich, Haifa (IL)

(73) Assignee: QUALCOMM INCORPORATED, San Diego, CA (US)

( * ) Notice: Subject to any disclaimer, the term of this patent is extended or adjusted under 35 U.S.C. 154(b) by 109 days.

(21) Appl. No.: 14/145,133

(22) Filed: Dec. 31, 2013

(65) Prior Publication Data

US 2014/0185551 A1 Jul. 3, 2014

Related U.S. Application Data

(60) Provisional application No. 61/748,314, filed on Jan. 2, 2013.

(51) Int. Cl.
  *H04Q 7/00* (2006.01)
  *H04L 1/00* (2006.01)

(52) U.S. Cl.
  CPC ............ *H04L 1/0033* (2013.01); *H04L 1/0015* (2013.01)

(58) Field of Classification Search
  None
  See application file for complete search history.

(56) References Cited

U.S. PATENT DOCUMENTS 8,483,186 B2 * 7/2013 Teo et al. ............ 370/334
8,824,420 B2 * 9/2014 Mehta et al. ............ 370/334

OTHER PUBLICATIONS

IEEE Standards Association, "IEEE Std 802.11ad-2012: Part 11: Wireless LAN Medium Access Control (MAC) and Physical Layer (PHY) Specifications—Amendment 3: Enhancements for Very High Throughput in the 60 GHz Band"; Dec. 28, 2012; pp. 278-281, 487-491, 461-464, 472, 473, 475, 476, 479.

* cited by examiner

*Primary Examiner* — Duc C Ho

(57) ABSTRACT

Disclosed is a device, a computer implemented method, and an apparatus for rate selection in a millimeter-wave communication system. The method includes performing antenna training on at least one antenna of the millimeter-wave communication system; conducting a rate search to select a modulation coding scheme (MCS) among a plurality of MCSs based upon an antenna configuration provided by the antenna training; engaging a rate lock on the selected MCS in response to determining that a reliable radio link has been found among the plurality of MCSs, wherein the selected MCS defines a constellation configuration and a code rate for transmitting millimeter-wave signals; and performing re-training of the antenna upon an event including any one of: failing to find a MCS which supports the reliable radio link, and determining a drop in reliability of the radio link.

23 Claims, 5 Drawing Sheets

TECHNIQUES FOR RATE SELECTION IN MILLIMETER-WAVE COMMUNICATION SYSTEMS

CROSS REFERENCE TO RELATED APPLICATION

The application claims the benefit of U.S. Provisional Application No. 61/748,314 filed Jan. 2, 2013, the contents of which are incorporated herein by reference.

TECHNICAL FIELD

The present invention relates generally to a millimeter-wave wireless communication system and, more particularity, to techniques for further enhancing the rate selection in such systems.

BACKGROUND

The 60 GHz band is an unlicensed band which features a large amount of bandwidth and a large worldwide overlap. The large bandwidth means that a very high volume of information can be transmitted wirelessly. As a result, multiple applications that require transmission of a large amount of data can be developed to allow wireless communication around the 60 GHz band. Examples of such applications include, but are not limited to, wireless high definition TV (HDTV), wireless docking stations, wireless Gigabit Ethernet, and many others. Wireless local area network (WLAN) standards, such as WiGig Alliance (WGA) and IEEE 802.11ad, are being developed to serve applications that utilize the 60 GHz spectrum.

In wireless communication systems such as the one described above, different operational modes are defined for the operation of the modem. Each operational mode is designed for a different scenario of the communication channel between a receiver and a transmitter in the communication system. That is, each scenario is typically related to a signal-to-noise ratio (SNR) or to a signal-to-interference ratio of the channel between the transmitter and receiver. The scenario may also be defined with regard to other parameters, such as temperature, amplifier stability, and the like.

The use of multiple modes allows a modem to be used in many scenarios, including some scenarios where the radio link throughput can be decreased (while reliability is maintained) when compared to other possible scenarios. Examples of those situations include, but are not limited to, a scenario where the SNR is 30 dB and, for comparison, a scenario where the SNR is 0 dB. In such a scenario, the difference in the received power levels in the receiver input is 1000 times. Such degradation in the SNR in most wireless communication systems is due to a decrease in the signal power, which in turn is due to either the effect of longer transmitter-receiver distance, or the effect of fading or shadowing.

The operational modes in most wireless communication modems are composed of two parameters: a constellation configuration and an error-correcting code rate. Some examples of possible constellation configurations are binary phase shift keying (BPSK), Quadrature Phase Shift Keying (QPSK), 16-Quadrature amplitude modulation (16-QAM), 64-QAM, spread-spectrum, and the like. Some examples of possible coding rates are ¼, ½, ⅝, ¾, and the like. These operational modes are referred to as Modulation and Coding Schemes (MCSs).

In millimeter-wave communication systems, such as that defined by the IEEE 802.11ad standard published Dec. 28, 2013 (hereinafter the IEEE 802.11ad standard), the high degradation due to the high frequency of the carrier signal is usually mitigated by using a small size array of antennas realized by small size antenna elements. Such an antenna array focuses the beam of the transmitting and receiving antennas, such that the transmitter-receiver channel's SNR or signal-to-interference, together with the noise on the channel, is maximized. This optimization depends on the physical locations of the transmitter, the receiver, and other objects located between the receiver and the transmitter.

In conventional wireless communication systems and, in particular, in systems that currently implement the IEEE 802.11ad standard, the decision regarding which MCS to be utilized is based on a trial-and-error process in which several MCSs (code rates and constellations) are tested, and the operational mode with the best performance is selected. However, because the physical channel changes from time to time, different codes should be used over time. Thus, the MCS selection process is re-performed when a new MCS needs to be selected.

A common conventional practice is to use a rate-scaling (or so-called link adaptation) process to obtain a reliable link. In the related art, when the transmitter detects a degradation in the channel reliability, the transmitter resorts to rate scaling to improve reliability, which typically also decreases the throughput. However, in some situations, for example, in the case of interferences, the throughput is actually increased.

A conventional rate selection process for restoring the channel reliability as commonly utilized by a millimeter-wave communication system 10 is shown in FIG. 1. As noted above, such a communication system typically includes an antenna array with a plurality of elements. In the conventional process, an antenna training process (S12) is performed first. An antenna (or beam-forming) training process is a bidirectional sequence of beam-forming training frame transmissions that provides the necessary signaling to allow each wireless station to determine appropriate antenna system settings for both transmission and reception antennas.

As shown in FIG. 1, following the antenna training, a rate-scaling process (S14) is utilized by the transmitter. Using the rate scaling process (S14), a proper modulation and coding scheme (MCS) can be used by the transmitter upon completion of the antenna array training. In sum, the antenna array training process (S12) and rate scaling process (S14) are alternately performed to establish a reliable communication link between the transmitter and receiver, each of which separately attempts to maximize the channel and communication system throughput.

In the rate-scale mode of operation (S14), whenever the transmitter detects a drop in the reliability of the link (channel), the transmitter decreases the throughput by changing the MCS, and then continues to operate the link. In some cases, when the error bit rate is burst, increasing the MCS can improve the link throughput. If no reliable link is obtained, even in an instance when the lowest MCS is selected, the rate-scaling sub-process (S14) stops, and the millimeter wave antenna arrays are re-trained to allow a better link.

Once a reliable link is re-established, conventional techniques try to find the best MCS by increasing the rate, while keeping a reliable radio link. The conventional techniques suffer from various drawbacks, such as requiring a longer period of time to obtain a reliable radio link. This is mainly because, first, in the current conventional techniques, all of the available MCSs are tried, and only after all MCSs have been tested is re-training of the antennas performed. In addition, upon obtaining the link through the antenna training, the last workable MCS is utilized, which results in long convergence times before the correct MCS may be identified (stationary rate-scale algorithm). Further, conventional rate scaling techniques typically result in sub-optimal links, as the rate-scaling (S14) finds a workable MCS despite the link degradation.

Therefore, it would be advantageous to provide a rate selection solution for millimeter-wave communication systems that overcomes the above-noted deficiencies.

SUMMARY

Certain exemplary embodiments disclosed herein include a method and apparatus for rate selection in a millimeter-wave communication system. The method comprises performing antenna training on at least one antenna of the millimeter-wave communication system; conducting a rate search to select a modulation coding scheme (MCS) among a plurality of MCSs based upon an antenna configuration provided by the antenna training; engaging a rate lock on the selected MCS in response to determining that a reliable radio link has been found among the plurality of MCSs, wherein the selected MCS defines constellation configuration and a code rate for transmitting millimeter-wave signals; and performing re-training of the antenna upon an event including any one of: failing to find a MCS which supports the reliable radio link, and determining a drop in reliability of the radio link.

BRIEF DESCRIPTION OF THE DRAWINGS

Various embodiments are particularly pointed out and distinctly claimed in the claims at the conclusion of the specification. The foregoing and other objects, features, and advantages of various embodiments described herein will be apparent from the following detailed description taken in conjunction with the accompanying drawings.

DETAILED DESCRIPTION

Figure 1:
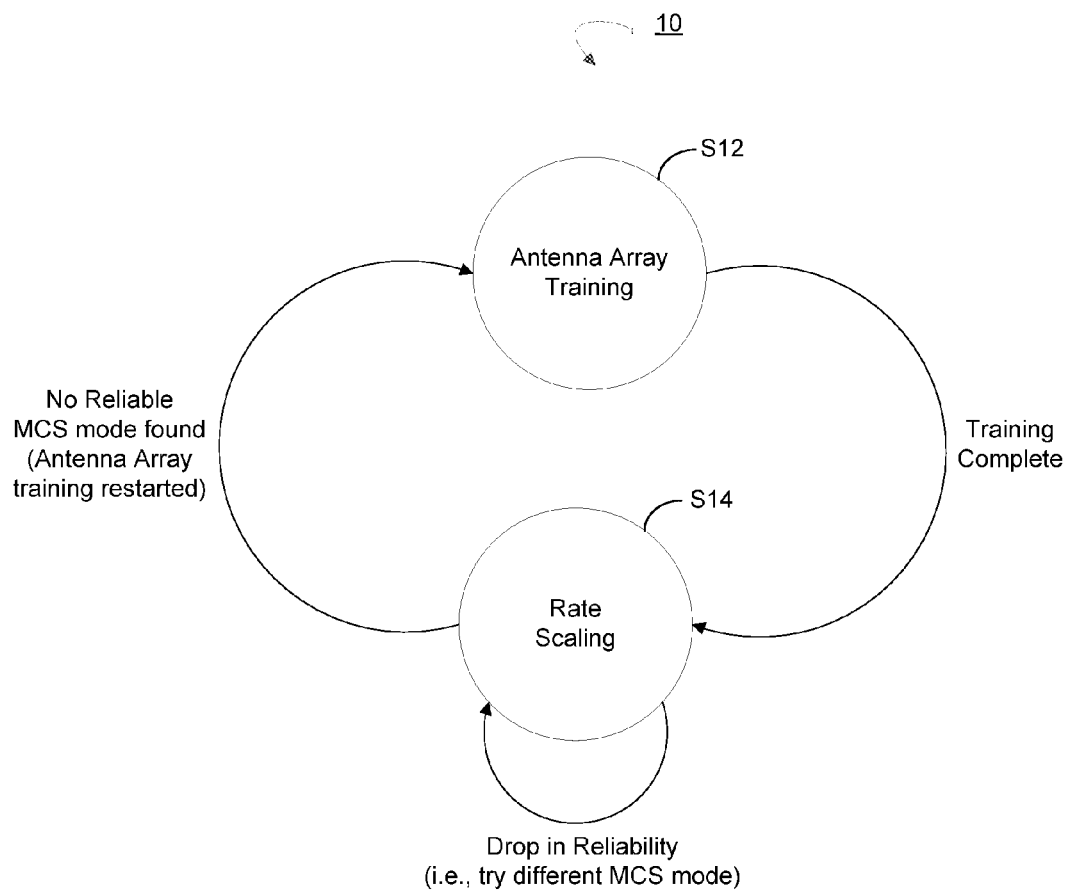
FIG. 1 is a flow diagram which describes the conventional technique of rate scaling to obtain a reliable radio millimeter-wave link.

The embodiments disclosed are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2:
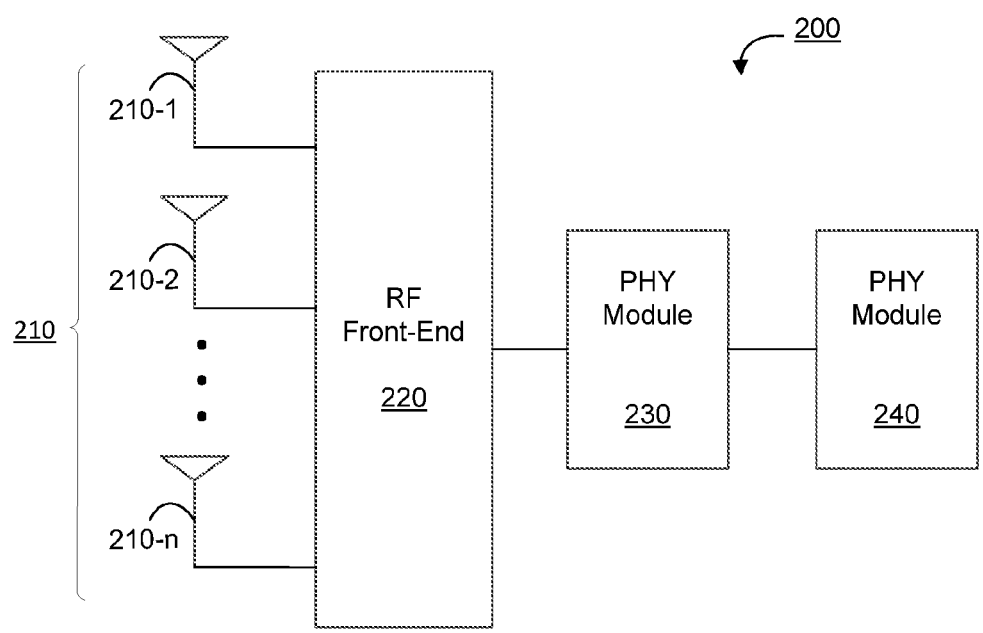
FIG. 2 is a block diagram of a directional millimeter-wave transceiver suitable for carrying out the example embodiments disclosed herein.

FIG. 2 is a block diagram of a millimeter-wave transceiver 200 suitable for carrying out the embodiments disclosed herein. As shown in FIG. 2, the millimeter-wave transceiver 200 includes an array of active antennas 210 coupled to a RF front end 220, a physical layer (PHY) module 230 that provides an interface to the wireless medium (link), and a medium access (MAC) layer module 240.

The array 210 comprises a number of N active antennas 210-1 through 210-N (N is an integer greater than 1) that may operate as transmit (TX) and/or receive (RX) antennas to transmit/receive millimeter-wave signals. In an embodiment, the array of antennas is configured to receive and transmit wireless signals in the 60 GHZ frequency band suitable for carrying out communications in accordance with at least the IEEE 802.11ad standard. An active antenna can be controlled to receive/transmit radio signals in a certain direction, to perform beam forming, and for switching from receive to transmit modes. For example, an active antenna array 210 may be a phased array antenna in which each radiating element can be controlled individually to enable the usage of beam-forming techniques. Other examples for arrays of active antennas 210 may include a set of switched beam antennas, directional multi-gigabit (DMG) antennas, and the like. Alternatively, the active antennas 210 can be a triple band antenna suitable for receiving data transmission over the frequency bands of 2.4 GHz, 5 GHz, or 60 GHz Bands.

The RF front-end 220 includes RF transmitting/receiving circuits to perform functions that include, for example, various amplifiers, up conversions of IF signals, down conversions of RF signals, various mixers, pulse filtration or polyphase filtration, down sampling, and guard interval removal adapted for OFDM or SCBT modulation as know by those skilled in the art.

The PHY layer module 230 and MAC layer module 240 are logical entities within the transceiver 200 that perform PHY and MAC layer operations compatible with communication protocol standards over the 60 GHz spectrum. In one example embodiment, PHY layer module 230 and MAC layer module 240 are communication protocol in compliant with the IEEE 802.11ad standard.

According to the disclosed embodiments, the MAC layer module 240, in addition to performing typical MAC layer operations, is configured to carry out the disclosed rate selection process. As will be discussed in greater detail below, the rate selection includes initiating antenna training on at least one antenna 210-1 through 210-N, conducting a rate search to select a modulation coding scheme (MCS) mode among a plurality of MCSs while using the best antenna configuration as established during the training, engaging a rate lock to determine that a reliable radio link has been found among the plurality of MCSs and perform re-training of the antenna in response to a failure to find a MCS which supports a reliable radio link or upon determining a drop in reliability of the radio link.

Figure 3:
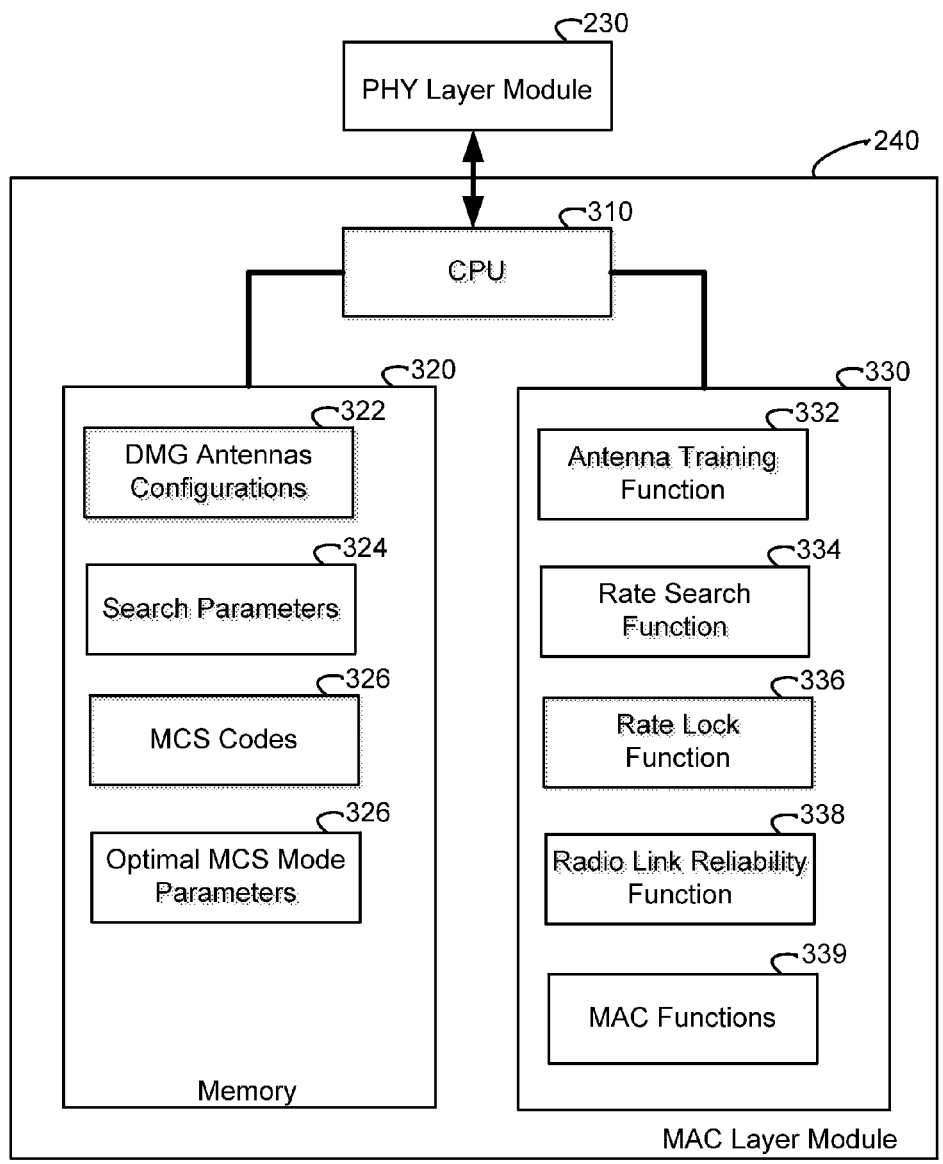
FIG. 3 is a block diagram of a MAC module shown in FIG. 2 and suitable for carrying out the example embodiments disclosed herein.

FIG. 3 illustrates a block diagram of the MAC layer module 240 according to one embodiment. The module 240 may include a processor or a processing unit, such as a CPU 310, which is coupled to a first computer-readable memory 320 and second computer memory 330 which can be either a read only memory (ROM) or a random access memory (RAM). Configuration settings and parameters are tangibly stored in the first computer-readable memory 320. These configuration settings are utilized by the computer programs stored in a second computer-readable memory 330 as well as by the beamforming mechanism, and may be performed, in part, by the PHY layer module 230.

For example, the first computer-readable memory 320 can be configured to include active antennas configurations 322, search parameters 324, modulation and coding scheme (MCS) codes 326, and current optimal MCS parameters 328. On the other hand, the computer-readable memory 330 can be configured to include computer instructions, including but not limited to, an antenna training function 332, a rate search function 334, a rate lock function 336, a radio link reliability function 338, and MAC functions 339.

The antenna training function 332 is utilized in tandem with the antennas configurations 322 to perform the beamforming (BF) process according to, for example, the IEEE 802.11ad standard. The BF process is typically employed by a pair of millimeter-wave stations, e.g., a receiver and transmitter. Each pairing of the stations achieves the necessary link budget for subsequent communication among those network devices. As such, BF training is a bidirectional sequence of BF training frame transmissions that uses sector sweep and provides the necessary signals to allow each station to determine appropriate antenna system settings for both transmission and reception. After the successful completion of BF training, a millimeter-wave communication link is established.

The beamforming process solves one of the problems for communication at the millimeter-wave spectrum, which is its high path loss. As such, as shown in FIG. 2, a large number of antennas are place at each transceiver to exploit the beamforming gain for extending communication range. That is, the same signal is sent from each antenna in an array, but at slightly different times.

According to an exemplary embodiment, the BF process includes a sector-level sweep (SLS) phase and a beam refinement stage. In the SLS phase, one of the STAs acts as an initiator by conducting an initiator sector sweep, which is followed by a transmit sector sweep by the responding station (where the responding station conducts a responder sector sweep). A sector is either a transmit antenna pattern or a receive antenna pattern corresponding to a sector ID. As mentioned above, a station may be the transceiver 220 that include one or more active antennas in the array 210.

The SLS phase typically concludes after an initiating station receives sector sweep feedback and sends a sector acknowledgement (ACK), thereby establishing BF. Each transceiver of the initiator station and of the responding station is configured for conducting a receiver sector sweep (RXSS) reception of sector sweep (SSW) frames via different sectors, in which a sweep is performed between consecutive receptions and a transmission of multiple sector sweeps (SSW) (TXSS) or directional multi-gigabit (DMG) beacon frames via different sectors, in which a sweep is performed between consecutive transmissions.

During the beam refinement phase, each station can sweep a sequence of transmissions, separated by a short beamforming interframe space (SBIFS) interval, in which the antenna configuration at the transmitter or receiver can be changed between transmissions. In other words, beam refinement is a process where a station can improve its antenna configuration (or antenna weight vector) both for transmission and reception. That is, each antenna 210-1 through 210-N (FIG. 2) includes an antenna weight vector (AWV), which further includes a vector of weights describing the excitation (amplitude and phase) for each element of an antenna array.

The modulation and coding scheme (MCS) codes 326 include parameters describing modulation and coding schemes for any one of an orthogonal frequency-division multiplexing (OFDM) set, single carrier (SC) and low power single carrier (LPSC). In one embodiment, the MCS codes 326 are defined as per the IEEE 802.11ad standard. That is, MCS codes 326 include a listing of data, for example, in searchable tabular form of MCS indexes 1-12 (Single carrier (SC)), MCS indexes 13-24 (Orthogonal frequency-division multiplexing (OFDM)), and MCS indexes 25-31 (low power SC (LPSC) modulation) as detailed in the IEEE 802.11ad standard.

With respect to OFDM, the IEEE 802.11ad standard describes parameters and configurations such as, for example, Staggered quadrature phase-shift keying (SQPSK), quadrature phase-shift keying (QPSK), 16-(16-QAM) or 64-QAM modulation techniques and code rates of ½, ⅝, ¾, or $^{13}/_{16}$. With respect to SC, the IEEE 802.11ad standard describes parameters and configurations, for example, $\pi/2$ binary phase shift keying (BPSK), $\pi/2$ Quadrature Phase Shift Keying (QPSK), or $\pi/2$ 16-Quadrature amplitude modulation (16-QAM), and code rates of ½, ⅝, ¾, or $^{13}/_{16}$ for SC. Also, with respect to LPSC, the IEEE 802.11ad standard describes parameters and configurations such as, for example, $\pi/2$ binary phase shift keying (BPSK) or $\pi/2$ Quadrature Phase Shift Keying (QPSK) and codes rates of $^{13}/_{28}$, $^{13}/_{21}$, $^{52}/_{63}$, or $^{13}/_{28}$, $^{13}/_{14}$. The above described modulation and coding scheme are merely non-limiting examples of MCS codes 326 other modulation and coding schemes are possible as known to those skilled in the art.

The radio link reliability function 338 is employed to determine the reliability of the radio link to a millimeter-wave communication system operating on the 60 GHz Band in accordance, for example, with the 802.11ad standard. In one example embodiment, based upon reception of acknowledgements (ACKs) at the transceiver 220 to transmitted signals, if the number of received ACKs is over a preconfigured threshold, then the link is determined to be reliable for the current tested MCS. The preconfigured threshold is set based on a desirable throughput on the link.

The rate search function 334 is employed to detect the optimal MCS out of the MCS codes 326. For each tested MCS, the function 334 configures the transmitter 200 to transmit a signal according to this MCS. Then, using the radio link reliability function 338, it is determined whether the link is reliable, for example, whether the number of received ACKs is above the pre-configured threshold or other methods or techniques of determining the reliability of a radio link as known in the art. The last tested MCS that provides a reliable link is locked by the rate lock function 338. The locked MCS may be saved in the optimal MCS parameters 328. If no operable MCS is found, the antenna training function 332 is employed again.

In an embodiment, the rate lock function 336 also configures the MAC functions to convey the locked (optimal) MCS to the PHY layer module 230. The PHY layer module 230 sends the MCS to the receiver station as part of the PHY layer header as defined the 802.11ad standard. Locking on a certain MCS means that the transceiver 200 will transmit signals using the code rate and constellation defined, for example in the IEEE 802.11ad standard for the locked MCS.

In one example embodiment, a computer-readable memory 330 tangibly embodies a program of instructions executable by the machine for causing performance of operations in accordance with each example function shown in FIG. 3 and in accordance with the disclosed embodiments. In another example embodiment, computer-readable memory 330 is a computer program configured with the at least one processor 310 to cause an apparatus, such as the transceiver 200, to carry out each example function shown in FIG. 3 and in accordance with disclosed embodiments. Computer programs as well as the methods of the various disclosed embodiments employing the above described functions, using configuration and parameters stored in memories will be described below in this disclosure.

Some non-limiting examples of electronic devices suitable for coupling to a millimeter-wave transceiver 200 include a computer connected via a PCI express bus or other connectivity bus standard such as a universal serial bus (USB), Serial Advanced Technology Attachment (SATA) bus and the like; similarly, an electronic device can be a laptop computer, a tablet computer, a PDA, a smartphone, a wearable computing device, a remote alarm terminal, a kiosk, a wireless modem or a millimeter-wave transceiver 200, which can be implemented as part of a transceiver array in a user equipment (e.g., smart phone, tablet or laptop computer) to support WIFI backhaul support as standardized by the Third Generation Partnership Project (3GPP) Long Term Evolution-Advance (LTE-A) or Beyond (LTE-B) standard or millimeter-wave transceiver 200, which can be implemented in a transceiver array of a First Responder wireless device in support of redundant WIFI backhaul network service for accessing a FirstNet Nationwide Network (FNN) or a transceiver 200 can be coupled to any consumer electronic device seeking to support applications which operate in the 60 GHz Band, for example, in compliance with or IEEE 801.11ad standards.

It should be noted that the exemplary embodiments disclosed herein provide that the millimeter-wave transceiver 200 can be located in an RF transmitting circuit or in a baseband unit of a transmitter in an electronic device seeking access to the 60 GHz Band. The millimeter-wave transceiver 200 can be closely co-located, such as in the one or more integrated circuits (ICs), in a single monistic IC, or cast on a printed circuit board (PCB).

As such, the positioning of the millimeter-wave transceiver 200 may be partially in a RF front-end and baseband unit separated and not closely co-located. This configuration is ideal for modern electronic devices, which have small form factors. Alternatively, as discussed below with respect to the computer implemented embodiments, the disclosed embodiments can be tangibly embodied in one or more computer modules represented in computer instructions carried out by one or more computer processes by way of a microprocessor, a CPU, microcontroller or digital signal processor (DSP) or field programmable gate array (FPGA).

Figure 4:
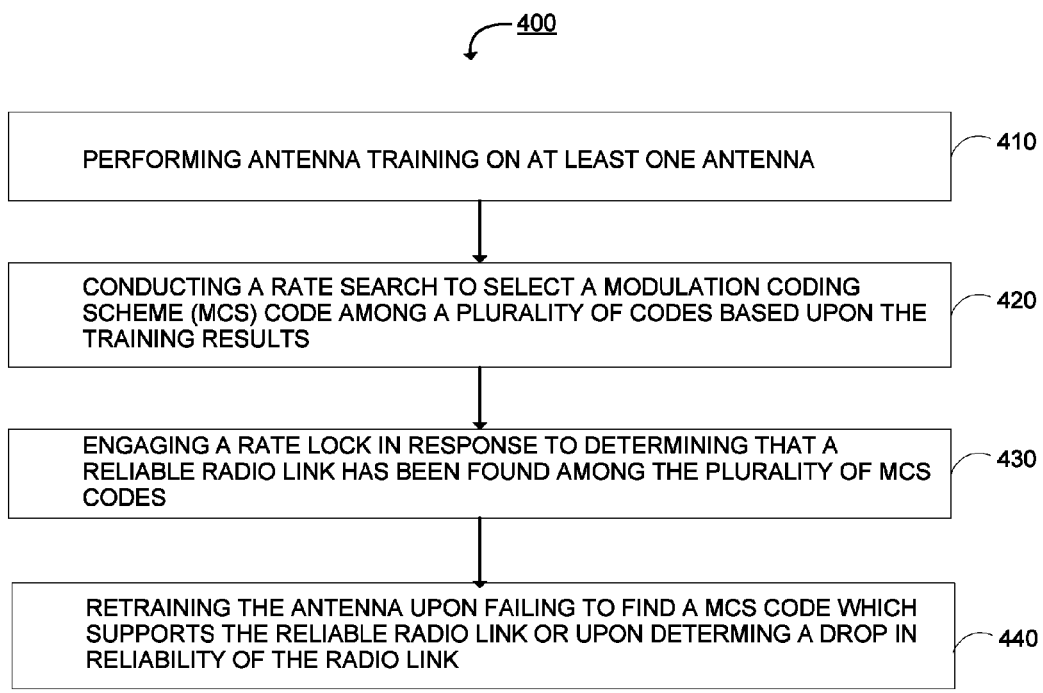
FIG. 4 is a flowchart that illustrates the operation of a method for performing rate selection and establishing a reliable radio link in a millimeter wave wireless communication system in accordance with example embodiments disclosed herein.

FIG. 4 shows a flow diagram 400 that illustrates the operation of a method for performing rate selection and establishing a reliable radio link in a millimeter-wave wireless communication system according to one embodiment. According to the method, in S410, antenna training is performed on at least one antenna. In an embodiment, the antenna training includes preforming a beamforming process. As noted above, a beamforming process is a bidirectional sequence of beamforming training frame transmissions that provides the necessary signaling to allow each wireless station to determine appropriate antenna system settings for both transmission and reception antennas. The beamforming process as defined by, for example, the IEEE 802.11ad standard, includes two stages: a sector level sweep (SLS) and a beam refinement protocol (BRP). During these stages, the two wireless stations exchange beamforming frames. Specifically, during the SLS stage, the wireless stations exchange information using the beamforming frames to determine their own best transmit sector and/or receive sector. The transmit and/or receive sectors are in the optimal directions to direct the transmit antenna and the receive antenna, respectively.

The BRP stage is a process in which each wireless station trains its respective receive and transmit antennas to improve their configuration using an iterative procedure. Once the beamforming training process is completed, the two stations select the optimal transmission rate over the established wireless link. In order to trigger the antenna training process S410, an indication that the wireless link needs to be established or re-established should first be received.

In S420, a rate search is conducted to select a modulation coding scheme (MCS) among a plurality of MCSs best for the selected antenna configuration. In S430, a rate lock is then engaged in response to determining that a reliable radio link has been found among the plurality of MCSs. In S440, re-training of the antenna is performed only upon failing to find a MCS which supports the reliable radio link or determining a drop in reliability of the radio link.

In one example embodiment, the rate search comprises iterating through a list of MCSs, from highest MCS to lowest MCS, testing each MCS to determine if it can support reliability of the radio link, wherein at each iteration, a lower MCS is tested as long as the reliability of the radio link is maintained.

In another example embodiment, the rate search comprises iterating through a list of MCSs, from lowest MCS to highest MCS testing each MCS to determine if it can support reliability of the radio link, wherein at each iteration, a higher MCS is tested as long as the reliability of the radio link is maintained.

In yet another example embodiment, the rate search comprises iterating through a list of MCSs by testing a first MCS located in the middle of the list; then, in response to determining that the first MCS does not support reliability of the radio link, testing a second MCS located between the highest MCS and the first MCS tested; subsequently, in response to determining that the second MCS does not support reliability of the radio link, testing a third MCS located between the lowest MCS and the first MCS tested, wherein the rate search continues to iterate through the list by testing MCSs located in between the first and second and third MCSs to find a code which will support reliability of the radio link.

In another example embodiment, the rate search does not test every possible MCS in the list—instead, the rate search only tests optimal MCSs located in the middle of the list as well as MCSs in high-middle and in low-middle ranges in the list.

In yet another example embodiment, optimal MCSs are selected for testing based upon information contained in one or more data packets or dedicated packets transmitted from one station to another by way of an information element.

In another example embodiment, the rate lock prevents a client station, an access point station, or a relay station from attempting to decrease the MCSs until a reliable radio link is obtained. Furthermore, the rate lock is discontinued upon detecting degradation in the reliability of radio link, and thereupon a client station or access point station directly activates an antenna array training procedure in order to improve the radio link.

In another example embodiment, the MCSs are modulation and coding schemes described in the as described in the IEEE 802.11ad standard. In yet another example embodiment, the radio link is configured to operate over the 60 GHz Band in accordance with the IEEE 802.11ad standard. Also, in another example embodiment, the at least one antenna is an antenna array configured to comprise at least 16 antenna elements.

Figure 5:
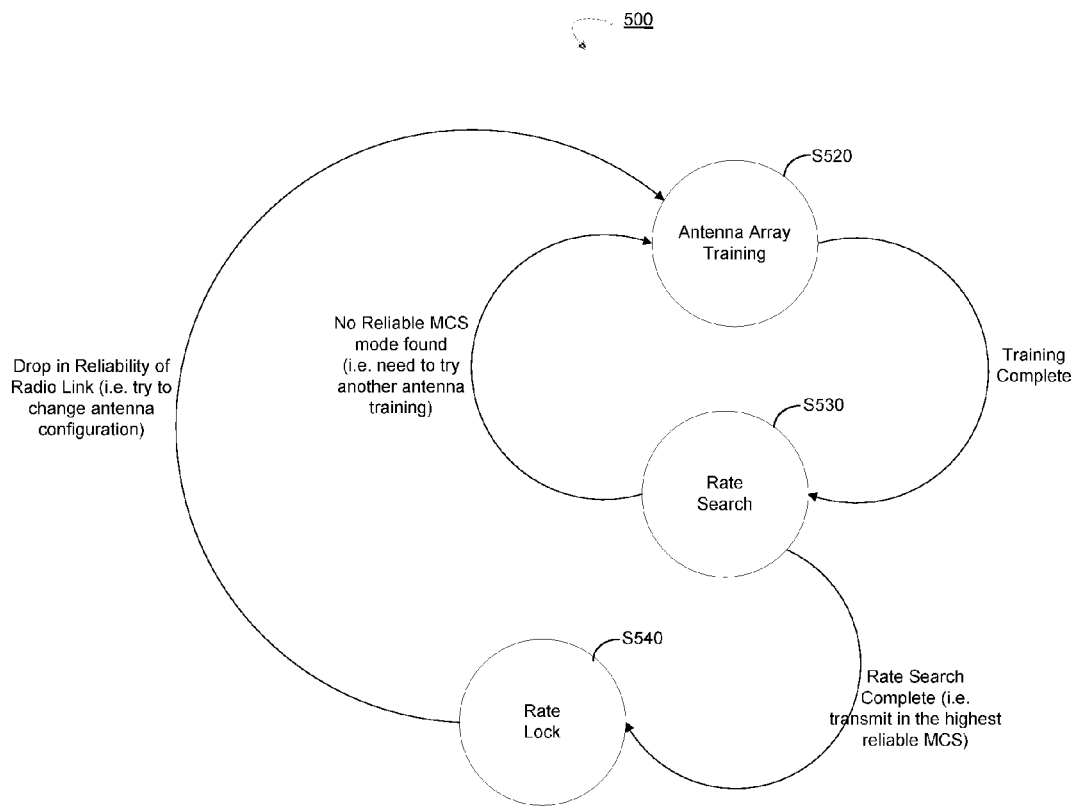
FIG. 5 is a flow diagram which describes rate selection and establishing a reliable radio link in a millimeter wave wireless communication system in accordance with example embodiments disclosed herein.

FIG. 5 shows a flow diagram 500 which describes a method and computer program for rate selection and establishing a reliable radio link in a millimeter-wave wireless communication system as described in accordance with an embodiment. In the embodiment, a millimeter-wave transmitter implementing the various embodiments disclosed herein does not try to decrease the MCS until a reliable link is obtained, but whenever degradation in the radio link reliability is detected, the transmitting modem directly activates the antenna array training procedure in order to improve the radio link.

The disclosed technique, as illustrated in FIG. 5, describes a process which starts at S520, in which an antenna training process is performed as discussed above. Then, at S530, a rate search is performed over the selected antenna configuration. In one embodiment, the rate search is performed by trying MCSs (rates) beginning with the lowest MCS (higher reliability). At each iteration, a higher code is tested so long as the link reliability is maintained. In another embodiment, the rate search includes first testing a middle MCS and, if such code ensures a reliable link, another MCS is tested which is the middle code between the highest MCS and the tested MCS. If such MCS does not provide a reliable link, then a different code is tried which is in the middle between the lowest MCS and the middle MCS that ensures a reliable link. Such a search is also referred to as "lion-in-the-desert". As noted above, a reliable link has been found when the number of received ACKs for signals transmitted using a current tested code MCS is above a preconfigured threshold.

Once the base code rate is found, a rate lock is performed at S540, and the transmitter stays at this state until the link changes. It should be noted that the rate corresponds to the MCS discussed above, that is, selection of a rate is equal to a selection of a MCS. It should be further noted that the rate-search performed herein ignores any previous history of code selections and assumes that the link is stable. If a proper rate cannot be found, the transmitter initiates the re-training of the antenna.

It should be appreciated that the rate search does not include rate scaling, (e.g., a trial-and-error process to find the best link), thereby minimizing the time required to find a best rate. As shown in FIG. 5, to further minimize the time required to obtain a reliable link when degradation in the link reliability is detected, the transmitter switches from the rate-lock state (S540) to an antenna training process (S520). This is in contrast to the conventional technique shown in FIG. 1 and described above that performs a rate scaling process in such an event.

In one embodiment, a rate-scaling process can be utilized with a small sub-set of MCSs, e.g., less than 5, to adjust the modem to changing temperature or to other small scale changes which cannot be mitigated by antenna training. In another embodiment, a fast MCS selection process can be performed as the rate search upon completion of the antenna training. This process uses the stability of the link to determine an optimal MCS. Various selection algorithms can be utilized by the fast MCS process including, but not limited to, a lion-in-the-desert algorithm. This algorithm includes trying a middle MCS (e.g., having a middle rate), and then, based on the result of the algorithm, another MCS is sent which is either in the high-middle or the low-middle range. This process reaches the best option within 5 tries for 16 MCSs (e.g., the 16 MCSs related to SCBT) instead of the 16 tries required in the conventional approach. Similarly, rate selection search reduction methods can be applied to OFDM and LPSC. In one embodiment, the rate lock state (S540) locks a sub-set of MCSs determined to be optimal.

Some embodiments may be used in conjunction with devices and/or networks operating in accordance with existing Wireless-Gigabit-Alliance (WGA) specifications and/or future versions and/or derivatives thereof, devices and/or networks operating in accordance with existing IEEE 802.11.ad standard and/or future versions and/or derivatives thereof.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of the disclosed embodiments.

The various embodiments disclosed herein can be implemented as hardware, firmware, software or any combination thereof. Moreover, the software is preferably implemented as an application program tangibly embodied on a program storage unit, a non-transitory computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

Also as used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a computer, laptop computer, a tablet or mobile phone or server, to perform various functions and (c) to circuits, such as a microprocessor(s) or a portion of a microprocessor(s), that require software or firmware for operation, even if the software or firmware is not physically presence. This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware.

What is claimed is:

1. A method for wireless communication, comprising:
performing antenna training to obtain an antenna configuration;
searching for a reliable radio link using the antenna configuration;
selecting a modulation coding scheme (MCS) among a plurality of MCSs corresponding to the reliable radio link if the reliable radio link is found via the search;
engaging a rate lock on the selected MCS if the reliable radio link is found via the search; and
performing re-training of the antenna if the reliable radio link is not found via the search or if the reliable radio link is found via the search and then a reliability of the reliable radio link drops below a threshold.

2. The method of claim 1, wherein searching for the reliable radio link comprises:
iterating through a list of MCSs of the plurality of MCSs, from a highest MCS to a lowest MCS, wherein the iterating through the list of MCSs comprises testing each MCS of the list of MCSs to determine if a corresponding radio link is reliable, wherein for each iteration, a lower MCS is tested as long as a reliability of the corresponding radio link is above the threshold.

3. The method of claim 1, wherein searching for the reliable radio link comprises:
iterating through a list of MCSs of the plurality of MCSs, from a lowest MCS to a highest MCS, wherein iterating through the list of MCSs comprises testing each MCS of the list of MCSs to determine if a corresponding radio link is reliable, wherein for each iteration, a higher MCS is tested as long as a reliability of the corresponding radio link is above the threshold.

4. The method of claim 1, wherein searching for the reliable radio link comprises:
iterating through a list of MCSs of the plurality of MCSs, wherein iterating through the list of MCSs comprises testing a first MCS located in a middle of the list of MCSs to find a reliable radio link;
if a reliable radio link is not found using the first MCS, testing a second MCS located between a highest MCS of the list of MCSs and the first MCS to find a reliable radio link;
if a reliable radio link is not found using the second MCS, testing a third MCS located between a lowest MCS and the first MCS to find a reliable radio link.

5. The method of claim 1, further comprising selecting a list of MCSs from the plurality of MCSs for testing during the search for the reliable MCS based upon information contained in one or more data packets or dedicated packets transmitted via an information element.

6. The method of claim 1, wherein the rate lock is discontinued if the reliability of the reliable radio link using the selected MCS drops below the threshold.

7. The method of claim 1, wherein the MCSs are modulation and coding schemes defined in the IEEE 802.11ad standard.

8. The method of claim 1, wherein the reliable radio link is configured to operate over a 60 GHz Band in accordance with the IEEE 802.11ad standard.

9. The method of claim 1, wherein a radio link is determined to be reliable if a number of ACKs received in response to signals transmitted using the selected MCS is over a preconfigured threshold.

10. The method of claim 1, wherein the method is performed by a medium access (MAC) layer module.

11. An apparatus for wireless communication, comprising:
at least one processor; and
at least one memory storing a computer program, wherein the at least one memory with the computer program is configured with the at least one processor to cause the apparatus to:
perform antenna training to obtain an antenna configuration;
search for a reliable radio link using the antenna configuration;
select a modulation coding scheme (MCS) among a plurality of MCSs corresponding to the reliable radio link if the reliable radio link is found via the search;
engage a rate lock on the selected MCS if the reliable radio link is found via the search; and
perform re-training of the antenna if the reliable radio link is not found via the search or if the reliable radio link is found via the search and then a reliability of the reliable radio link drops below a threshold.

12. The apparatus of claim 11, wherein searching for the reliable radio link comprises:
iterating through a list of MCSs of the plurality of MCSs, from a highest MCS to a lowest MCS, wherein the iterating through the list of MCSs comprises testing each MCS of the list of MCSs to determine if a corresponding radio link is reliable, wherein for each iteration, a lower MCS is tested so long as a reliability of the corresponding radio link is above the threshold.

13. The apparatus of claim 11, wherein searching for the reliable radio link comprises:
iterating through a list of MCSs of the plurality of MCSs, from a lowest MCS to a highest MCS, wherein iterating through the list of MCSs comprises testing each MCS of the list of MCSs to determine if a corresponding radio link is reliable, wherein for each iteration, a higher MCS is tested so long as a reliability of the corresponding radio link is above the threshold.

14. The apparatus of claim 11, wherein searching for the reliable radio link comprises:
iterating through a list of MCSs of the plurality of MCSs, wherein iterating through the list of MCSs comprises testing a first MCS located in a middle of the list of MCSs to find a reliable radio link;
if a reliable radio link is not found using the first MCS, testing a second MCS located between a highest MCS of the list of MCSs and the first MCS to find a reliable radio link;
if a reliable radio link is not found using the second MCS, testing a third MCS located between a lowest MCS and the first MCS to find a reliable radio link.

15. The apparatus of claim 11, wherein a list of MCSs of the plurality of MCSs is selected for testing during the search for the reliable radio link based upon information contained in one or more data packets or dedicated packets transmitted via an information element.

16. The apparatus of claim 11, wherein the rate lock is discontinued if the reliability of the reliable radio link using the selected MCS drops below the threshold.

17. The apparatus of claim 11, wherein the MCSs are modulation and coding schemes defined in the IEEE 802.11ad standard.

18. The apparatus of claim 11, wherein the reliable radio link is configured to operate over a 60 GHz frequency band in accordance with the IEEE 802.11ad standard.

19. The apparatus of claim 11, wherein a radio link is determined to be reliable if a number of ACKs received in response to signals transmitted using the selected MCS is over a preconfigured threshold.

20. The apparatus of claim 11, wherein the apparatus is a medium access (MAC) layer module.

21. A non-transitory program storage device readable by a machine, tangibly embodying a program of instructions executable by the machine for causing performance of operations for wireless communication, the operations comprising:
performing antenna training to obtain an antenna configuration;
searching for a reliable radio link using the antenna configuration;
selecting a modulation coding scheme (MCS) among a plurality of MCSs corresponding to the reliable radio link if the reliable radio link is found via the search;
engaging a rate lock on the selected MCS if the reliable radio link is found via the search; and
performing re-training of the antenna if the reliable radio link is not found via the search or if the reliable radio link is found via the search and then a reliability of the reliable radio link drops below a threshold.

22. An apparatus for wireless communication, comprising:
means for performing antenna training to obtain an antenna configuration;
means for searching for a reliable radio link using the antenna configuration;
means for selecting a modulation coding scheme (MCS) among a plurality of MCSs corresponding to the reliable radio link if the reliable radio link is found via the search;
means for engaging a rate lock on the selected MCS if the reliable radio link is found via the search; and
means for performing re-training of the antenna if the reliable radio link is not found via the search or if the reliable radio link is found via the search and then a reliability of the reliable radio link drops below a threshold.

23. A wireless station, comprising:
at least one antenna; and
a processing system configured to:
  perform antenna training to obtain an antenna configuration;
  search for a reliable radio link using the antenna configuration;
  select a modulation coding scheme (MCS) among a plurality of MCSs corresponding to the reliable radio link if the reliable radio link is found via the search;
  engage a rate lock on the selected MCS if the reliable radio link is found via the search; and
  perform re-training of the antenna if the reliable radio link is not found via the search or if the reliable radio link is found via the search and then a reliability of the reliable radio link drops below a threshold.

* * * * *